United States Patent
Trojanova et al.

(10) Patent No.: US 8,941,651 B2
(45) Date of Patent: Jan. 27, 2015

(54) OBJECT ALIGNMENT FROM A 2-DIMENSIONAL IMAGE

(75) Inventors: Jana Trojanova, Usti nad Labem (CZ); Saad J. Bedros, West St. Paul, MN (US); Gurumurthy Swaminathan, Bangalore (IN); Yadhunandan Ullam Subbaraya, Tirupati (IN)

(73) Assignee: Honeywell International Inc., Morristown, NJ (US)

( * ) Notice: Subject to any disclaimer, the term of this patent is extended or adjusted under 35 U.S.C. 154(b) by 427 days.

(21) Appl. No.: 13/228,188

(22) Filed: Sep. 8, 2011

(65) Prior Publication Data

US 2013/0063417 A1    Mar. 14, 2013

(51) Int. Cl.
| | |
|---|---|
| G06T 17/20 | (2006.01) |
| G06T 17/00 | (2006.01) |
| G06T 19/00 | (2011.01) |
| G06T 15/00 | (2011.01) |
| G06T 7/00 | (2006.01) |
| G06K 9/00 | (2006.01) |

(52) U.S. Cl.
CPC .............. *G06T 15/00* (2013.01); *G06T 7/0051* (2013.01); *G06T 17/20* (2013.01); *G06T 7/0032* (2013.01); *G06K 9/00208* (2013.01); *G06K 9/00221* (2013.01); *G06T 2207/30201* (2013.01)
USPC ............................ 345/420; 345/419; 345/423

(58) Field of Classification Search
CPC .......... G06T 19/00; G06T 17/20; G06T 17/00
USPC ........................................ 345/419, 420, 423
See application file for complete search history.

(56) References Cited

U.S. PATENT DOCUMENTS

| | | | |
|---|---|---|---|
| 6,018,347 A * | 1/2000 | Willis | 345/419 |
| 6,393,143 B1 * | 5/2002 | Pipitone | 382/154 |
| 7,095,879 B2 * | 8/2006 | Yan et al. | 382/118 |
| 7,218,774 B2 * | 5/2007 | Liu | 382/154 |
| 7,289,648 B2 * | 10/2007 | Liu | 382/118 |
| 8,213,707 B2 * | 7/2012 | Li et al. | 382/154 |
| 8,284,240 B2 * | 10/2012 | Saint-Pierre et al. | 348/47 |
| 2009/0002514 A1 * | 1/2009 | Steinberg et al. | 348/222.1 |

\* cited by examiner

*Primary Examiner* — Kimbinh T Nguyen
(74) *Attorney, Agent, or Firm* — Brooks, Cameron & Huebsch, PLLC (57) ABSTRACT

The present disclosure provides methods, machine readable media, and systems for object alignment from a 2-dimensional (2-D) image of the object. One or more embodiments include defining a 2-D shape in the 2-D image and a 3-dimensional (3-D) shape in a 3-D model of the object, mapping a number of corresponding points on the 2-D and 3-D shapes, defining the 2-D and 3-D shapes with a number of triangles, wherein a number of vertices of the number of triangles correspond to the number of points, subdividing the number of triangles defining the 2-D and 3-D shapes into a plurality of subdivided triangles that include a plurality of new vertices, and reconstructuring a 3-D image from the 2-D image by assigning a number of z-coordinates from the plurality of subdivided triangles of the 3-D shape to the plurality of subdivided triangles of the 2-D shape to create a 3-D reconstructured shape.

19 Claims, 4 Drawing Sheets

OBJECT ALIGNMENT FROM A 2-DIMENSIONAL IMAGE

TECHNICAL FIELD

The present disclosure relates to object alignment from a 2-dimensional image.

BACKGROUND

Object (e.g., face of an individual) recognition can be used to identify an object and/or individual from a 2-dimensional (2-D) digital image from a still camera and/or video camera based on characteristics that are unique to the object. Upon recognition, various systems can be provided to, for example, identify an individual and/or grant access to the individual. However, for a number of object recognition systems to identify an object in a 2-D image and/or accurately identify the object, the object may need to possess a particular pose (e.g., frontal pose, side pose) in the 2-D image. This, therefore, can present challenges when the object in the 2-D image does not possess the particular pose required by an object recognition system because the object recognition system may not be able to identify and/or accurately identify the object in the 2-D image.

Some prior solutions have utilized an eye detector to align a face of an individual to a normalized position (e.g., frontal pose) based upon a position of the eyes. Some of these solutions, however, can prove to be ineffective when a pose of the face of the individual varies by more than five degrees from a normalized position, for example. Other solutions have used methodology respecting a non-rigid deformation of face (e.g., facial expressions) to align the face of the individual. These solutions, however, can be computationally intensive, especially in regards to depth estimation of a face from a single 2-D image.

DETAILED DESCRIPTION

The present disclosure provides methods, machine readable media, and systems for object alignment from a 2-dimensional (2-D) image of the object. One or more embodiments include defining a 2-D shape in the 2-D image and a 3-dimensional (3-D) shape in a 3-D model of the object, mapping a number of corresponding points on the 2-D and 3-D shapes, defining the 2-D and 3-D shapes with a number of triangles, wherein a number of vertices of the number of triangles correspond to the number of points, subdividing the number of triangles defining the 2-D and 3-D shapes into a plurality of subdivided triangles that include a plurality of new vertices, and reconstructing a 3-D image from the 2-D image by assigning a number of z-coordinates from the plurality of subdivided triangles of the 3-D shape to the plurality of subdivided triangles of the 2-D shape to create a 3-D reconstructured shape.

Embodiments of the present disclosure can provide for object alignment from a 2-D image where the object in the 2-D image is in a number of pose variations. In obtaining a 2-D image of an object (e.g., face of an individual), it can be difficult to attain a pose of the object, which does not have a pose variation. For example, if a 2-D image of an individual is taken, it may be difficult to attain an image of the individual's face in a frontal pose. Oftentimes, the individual's face can vary a number of degrees from a frontal pose and can be directed away from the camera.

Some embodiments of the present disclosure can reduce a number and intensity of calculations required to determine a depth of an object from a 2-D image. In an example, z-coordinates of the 2-D image can be determined through defining a 2-D shape in the 2-D image and a 3-D shape in a 3-D model through triangles with the same structure and assigning a number of z-coordinates from the vertices of the triangles from the 3-D shape, which can be obtained by simultaneous subdivision of the triangles, to the 2-D shape.

In the following detailed description of the present disclosure, reference is made to the accompanying drawings that form a part hereof, and in which is shown by way of illustration how one or more embodiments of the disclosure may be practiced.

These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102-1 may reference element "2-1" in FIG. 1, and a similar element may be referenced as 202-1 in FIG. 2.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

As used herein, "a" or "a number of" something can refer to one or more such things. For example, "a number of differences" can refer to one or more differences.

One or more embodiments of the present disclosure can include a system for object alignment from a 2-D image of the object. A 2-D shape in the 2-D image and a 3-D shape in a 3-D model of the object can be defined, wherein the object can be a face of an individual. Alternatively, and/or in addition, the object can be a portion of the face of an individual (e.g., nose, mouth) and/or an inanimate object (e.g., vase, chair). In an example, the 2-D image can be an image taken from a still camera and/or a frame from video taken by a video camera, wherein the still camera and/or video camera are digital cameras. Alternatively, and/or in addition, the still camera and/or video camera can be film cameras and the 2-D image can be a digital scan of an image taken by the still camera and/or frame from the video taken by the video camera.

In some embodiments, the 2-D shape can be defined by localizing the 2-D shape manually and/or by using an Active Shape Model. Localizing the 2-D shape can include, for example, restricting an image to a particular feature (e.g., shape of the feature), which can then be further analyzed in separation from other features located on the object. This can be done manually, for example through a user interface, where a feature is cut from the object by a user so that the feature can be analyzed.

Alternatively, and/or in addition, this can be done automatically through use of, for example, an Active Shape Model. The Active Shape Model can be defined as a statistical model of shapes of objects, which iteratively deform to fit to an example of the object in a new image. The shapes can be constrained by a statistical shape model to vary in ways seen in a training set of labeled examples. For example, a number of images can be used as a training set, where shapes of objects can be defined through edges associated with the shape of the objects and/or through an intensity of the object, for example. Intensity of the object can be defined as a grayscale and/or color variation across an image or parts of an image. By training the model for the number of images and shapes of objects associated with those images, objects in new images can be localized.

In various embodiments, the 3-D model of the object can be defined by determining a first set of points for a first 3-D training object and a second set of points for a second 3-D training object and taking an average between the first and second set of points. For instance, a first 3-D training object can be obtained by taking a 3-D scan of the object and selecting the first set of points, wherein each of the first set of points includes an x, y, z coordinate. In an example, any number of points can be included in the first and second set of points.

The first set of points can be chosen such that a number of the points in the set of points are located around and/or on distinguishing features of the object. For example, if the object is a face of an individual, the points can be selected to obtain the x, y, z coordinates of points located on the individual's facial features (e.g., nose, eyes, mouth, cheeks, eyebrows, scar etc.).

Alternatively, and/or in addition, points can be selected along edges of the individual's facial features and/or variations in intensity across an individual's face, for example. An edge can be defined as a line that distinguishes a first feature of an object from a second feature of the object. For example, when the object is an individual's face, an edge can be defined as a line where a person's lips meet and/or a line between a person's eye and their eyelid, for example. By choosing points along edges and/or variations in intensity, a number of 3-D shapes can be defined on the 3-D model. Alternatively, and/or in addition, the first set of points can be chosen randomly.

In some embodiments, the second set of points can be chosen in a manner analogous to how the first set of points is chosen. In an example, the second set of points can correspond to the first set of points, such that an average between the x, y, z coordinates of a first point in the set of first points and a first point in the set of second points can be taken. The average of the x, y, z coordinates can then be saved as separate matrices. For example, the average of the x, y, z coordinates for a number of points can be distributed over the matrices X, Y, Z:

$$X(i,j)=x(k)$$

$$Y(i,j)=y(k)$$

$$Z(i,j)=z(k)$$

where i,j are indexes of matrix X, Y, Z and k is an index of the points x, y, z.

For instance, an X matrix can include x coordinates of the 3-D model, a Y matrix can include y coordinates of the 3-D model, and a Z matrix can include z coordinates of the 3-D model. Although choosing a first and second set of points is discussed, embodiments of the present disclosure are not so limited and any number of sets of points can be chosen.

Upon definition of the 3-D model and/or a number of shapes of the object, it is not required to make additional models of the 3-D model of the object. The 3-D model of the object can be stored, for example, in a database and used to provide object alignment for a number of 2-D images of the object. However, in various embodiments, the 3-D model can be updated for reasons such as a characteristic of an object changing (e.g., an individual's face aging).

In some embodiments, a number of corresponding points on the 2-D and 3-D shapes and/or 3-D model can be mapped. This can include corresponding the average of the x and y coordinates from the 3-D model to corresponding positions on the 2-D shape. In an example, the indexes (i,j) of the 3-D model saved in matrix X, Y, Z can correspond to points in the 2-D shape.

Figure 1:
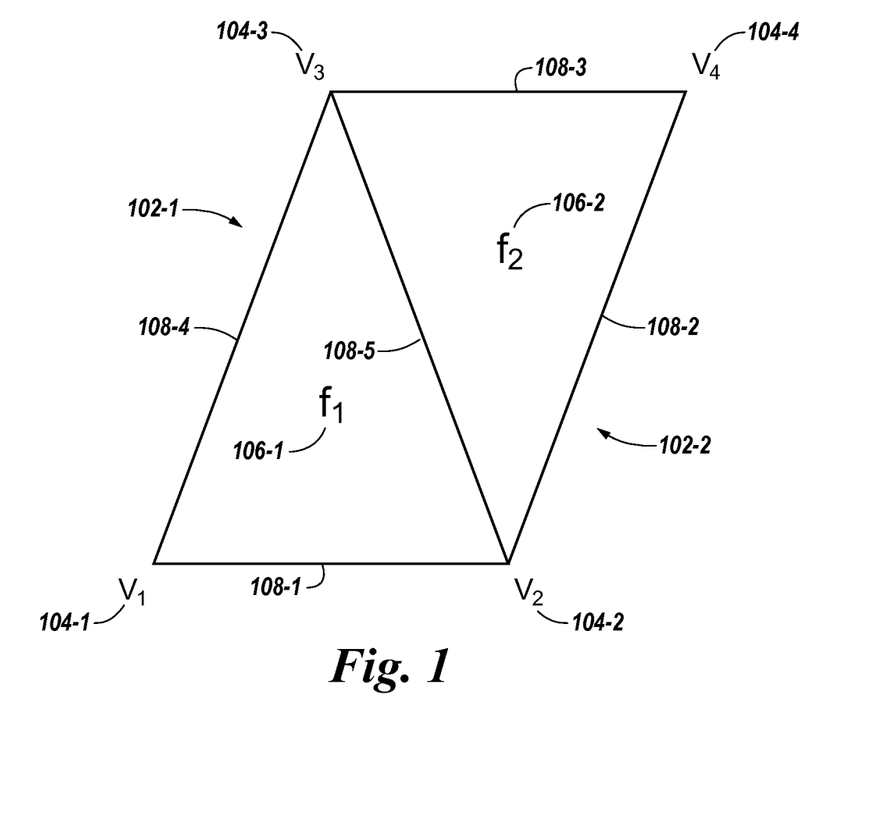
FIG. 1 illustrates a number of triangles defining a 2-D shape according to one or more embodiments of the present disclosure.

FIG. 1 illustrates a number of triangles defining a 2-D shape according to one or more embodiments of the present disclosure. In various embodiments, the 2-D shape can be defined with a number of triangles 102-1, 102-2 represented by faces 106-1, 106-2, wherein a number of vertices 104-1, . . . , 104-4 on the number of triangles correspond to the number of points (e.g., share the same x and y coordinates as each of the number of points). In an example, a first point can be connected to a second point with a line and the first and second points can be connected to a third point, forming a triangle, wherein the triangle forms a portion of a basic shape of a feature of an individual's face. For example, a first point can be located on a dorsal hump of an individual's nose; a second point can be located at a side of an individual's nostril; and a third point can be located at an opposing side of an opposing nostril. Upon connection of the points, a triangle (e.g., 102-1) can be formed with the number of vertices 104-1, 104-2, and 104-3, which can define a basic shape of the individual's nose, and can be represented by a face 106-1.

In various embodiments, the number of vertices 104-2, 104-3 can form part of an adjacent triangle 102-2. Adjacent triangle 102-2 can be formed in a manner analogous to how triangle 102-1 is formed. Triangle 102-2 can define a basic shape of an additional feature of the individual's face. For example, vertex 104-4 can be located at a protruding cheek bone. Upon connection of the number of vertices 104-2, 104-3, and 104-4, a triangle 102-2 can be formed, represented by a face 106-2.

The 3-D shape can be defined with a number of triangles in a manner analogous to how the 2-D shape can be defined with the number of triangles. In an example, the 3-D shape can be defined with a number of triangles with faces, wherein a number of vertices on the number of triangles correspond to the number of points (e.g., share the same x, y, z coordinates as each of the number of points).

In some embodiments, the vertices (e.g., 104-1, . . . , 104-4) can represent coordinates of the shape for the 2-D shape and 3-D shape. For example:

$$V=v_i, \text{ where } v_i=\{x_i,y_i\} \text{ for 2-D shape and } v_i=\{x_i,y_i,z_i\}$$
$$\text{for 3-D shape}$$

For example, a number of vertices for a triangle defining a 2-D shape can be represented as:

$$V = \begin{bmatrix} v_1 \\ v_2 \\ v_3 \end{bmatrix} = \begin{bmatrix} x_1 & y_1 \\ x_2 & y_2 \\ x_3 & y_3 \end{bmatrix}$$

where $x_1, y_1$ are coordinates for vertex $v_1$, for example.

In some embodiments, faces of the triangle (e.g., 106-1, 106-2) can represent the triangle, for example:

$$F = f_k, \text{ where } f_k = \{V_A, V_B, V_C\}$$

where $f_k$ represents the triangle face (e.g., set of vertices forming triangle). Faces can therefore be processed as vectors, for example, in relation to FIG. 1:

$$F = \begin{bmatrix} f_1 \\ f_2 \end{bmatrix} = \begin{bmatrix} v_1 & v_2 & v_3 \\ v_2 & v_3 & v_4 \end{bmatrix}$$

where $f_1$ represents face 106-1 and $f_2$ represents face 106-2 and $v_1, \ldots, v_4$ are representative of vertices 104-1, ..., 104-4.

In one or more embodiments, after triangle subdivision a uniqueness of the number of vertices can be determined. Unique vertices can then be concatenated to form new triangles, for example:

$$F = \begin{bmatrix} f_1 \\ f_2 \end{bmatrix} = \begin{bmatrix} f_{c1} & f_{c2} & f_{c3} \\ v_1 & v_2 & v_3 \\ v_2 & v_3 & v_4 \end{bmatrix}$$

where $f_{c1}$, $f_{c2}$, $f_{c3}$ represent face columns 1, 2, and 3 in the matrix F. For each unique face column combination (e.g., $f_{c1}$ and $f_{c2}$ equate to $V_{new12}$) new vertices can be generated, for example:

$$V_{new12} = E(V(f_{C1}), V(f_{C2}))$$

$$V_{new23} = E(V(f_{C2}), V(f_{C3})) \Rightarrow V = [V \; V_{new12} \; V_{new23} \; V_{new13}]$$

$$V_{new13} = E(V(f_{C1}), V(f_{C3}))$$

A new unique vertices can then be assigned with an incremental number of the vertices, for example:

$$V_{new12} = V_5$$

$$V_{new23} = V_7$$

$$V_{new13} = V_6$$

Figure 2:
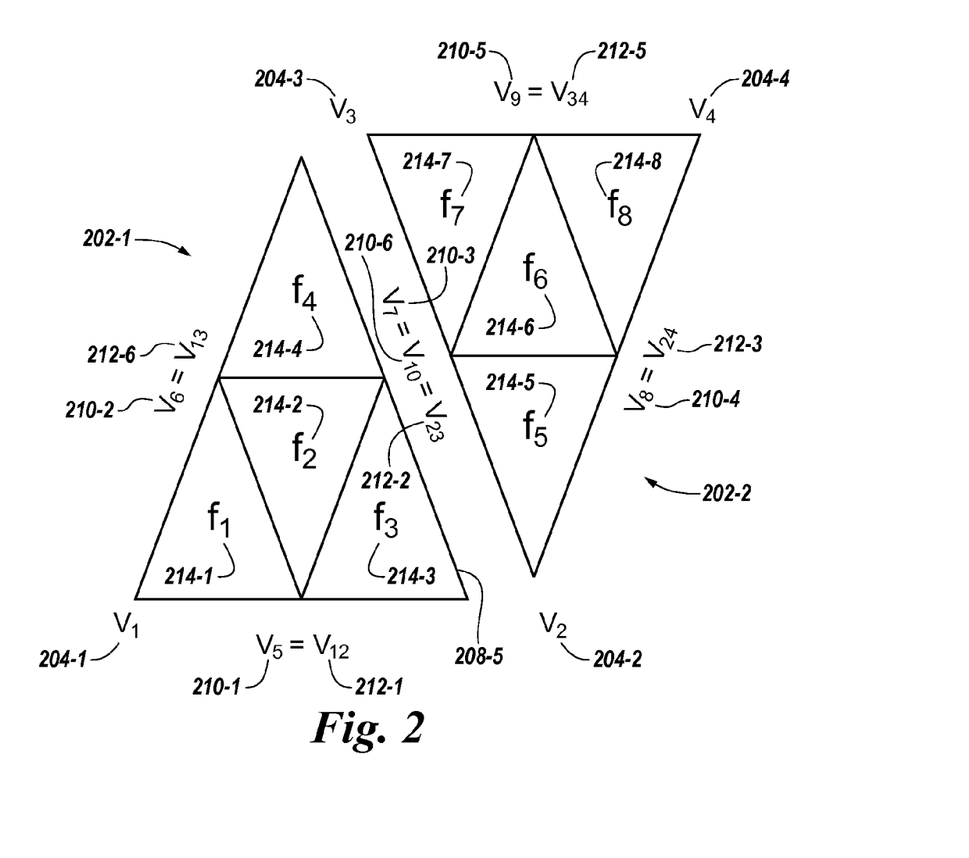
FIG. 2 illustrates subdivision of a number of triangles defining a 2-D shape according to one or more embodiments of the present disclosure.

FIG. 2 illustrates subdivision of a number of triangles defining a 2-D shape according to one or more embodiments of the present disclosure. In some embodiments of the present disclosure, the number of triangles defining the 2-D and 3-D shape can be subdivided into a plurality of subdivided triangles represented by new faces 214-1, . . . , 214-8 that include a plurality of new vertices 210-1, . . . , 210-6 and a plurality of vectors 212-1, . . . , 212-6 along edges of the number of triangles 202-1, 202-2. Alternatively, and/or in addition, the number of triangles defining the 2-D and 3-D shape can be simultaneously divided. In an example, a middle point for each edge of the number of triangles 202-1, 202-2 can be calculated and each middle point can be assigned as one of the plurality of new vertices 210-1, . . . , 210-6 for the plurality of subdivided triangles.

When the number of triangles share an edge 208-5, as shown in FIG. 2, a determination can be made regarding whether there is a redundancy in the plurality of new vertices 210-1, . . . , 210-6. If there is a redundancy in the plurality of new vertices 210-1, . . . , 210-6, new vertices of the plurality of new vertices 210-1, . . . , 210-6 that are redundant can be removed.

In one or more embodiments, new faces 214-1, . . . , 214-8 can be generated for new vertices 210-1, . . . , 210-6. In an example, each triangle can be subdivided into four subdivided triangles, forming four new faces 214-1, . . . , 214-4 for triangle 202-1 and four new faces 214-5, . . . , 214-8 for triangle 202-2. Therefore, new faces (e.g., 214-1, . . . , 214-4) are created as a combination of existing and new vertices, for example:

$$\begin{matrix} F_1 = [v_1 \; v_{12} \; v_{13}] \\ F_2 = [v_2 \; v_{12} \; v_{23}] \\ F_3 = [v_3 \; v_{13} \; v_{23}] \\ F_4 = [v_{12} \; v_{13} \; v_{23}] \end{matrix} \Rightarrow F = \begin{bmatrix} F_1 \\ F_2 \\ F_3 \\ F_4 \end{bmatrix}$$

In relation to triangle 202-1, therefore:

$$v_{12} = v_5$$

$$v_{23} = v_7$$

$$v_{13} = v_6$$

$$F_1 = [v_1 v_5 v_6]$$

$$F_2 = [v_2 v_5 v_7]$$

$$F_3 = [v_3 v_7 v_6]$$

$$F_4 = [v_5 v_6 v_7]$$

where $F_1, \ldots, F_4$ are faces 214-1, . . . , 214-4 and are vertices 204-1, . . . , 204-3, and new vertices 210-5, . . . , 210-7. In an example, a midpoint of an edge of each side of the number of triangles forms a vertex for the four subdivided triangles.

In one or more embodiments, a number of z-coordinates from the 3-D shape can be assigned to the 2-D shape to create a 3-D reconstructured shape. In an example, z-coordinates associated with x and y-coordinates from the 3-D shape can be assigned to the corresponding x and y-coordinates in the 2-D shape of the image. The correspondence of x and y-coordinates can be assured by starting with a triangle structure in the 2-D image and the 3-D model that is the same. Alternatively and/or in addition, the triangles can be simultaneously subdivided.

In various embodiments, a texture corresponding to a point and/or vertex on the 2-D shape can be added to a corresponding point and/or vertex on the 3-D reconstructured shape. In an example, the texture can be added according to an intensity value at the point and/or vertex on the 2-D shape. For example, the texture corresponding to the plurality of new vertices for the plurality of subdivided triangles on the 2-D shape can be added to the corresponding new vertices for the plurality of subdivided triangles on the 3-D reconstructured shape. Alternatively, and/or in addition, a texture corresponding to a portion of the 2-D shape can be added to a corresponding portion of the 3-D reconstructured shape. In an example, an average intensity of a portion of the 2-D shape can be determined and applied to the corresponding portion of the 3-D reconstructed shape.

Alternatively, and/or in addition, a texture within one of the number of triangles of the 2-D shape can be determined and applied to a corresponding one of the number of triangles of the 3-D reconstructed shape. In an example, an average intensity within one of the number of triangles of the 2-D shaped can be determined and applied to a corresponding one of the number of triangles of the 3-D reconstructed shape. In a manner analogous to that discussed in relation to the number of triangles, a texture within one of the plurality of subdivided triangles of the 2-D shape can be determined and applied to a corresponding one of the number of triangles of the 3-D reconstructed shape. As discussed herein, intensity can be defined as grayscale and/or color variation across an image or parts of an image.

Figure 3:
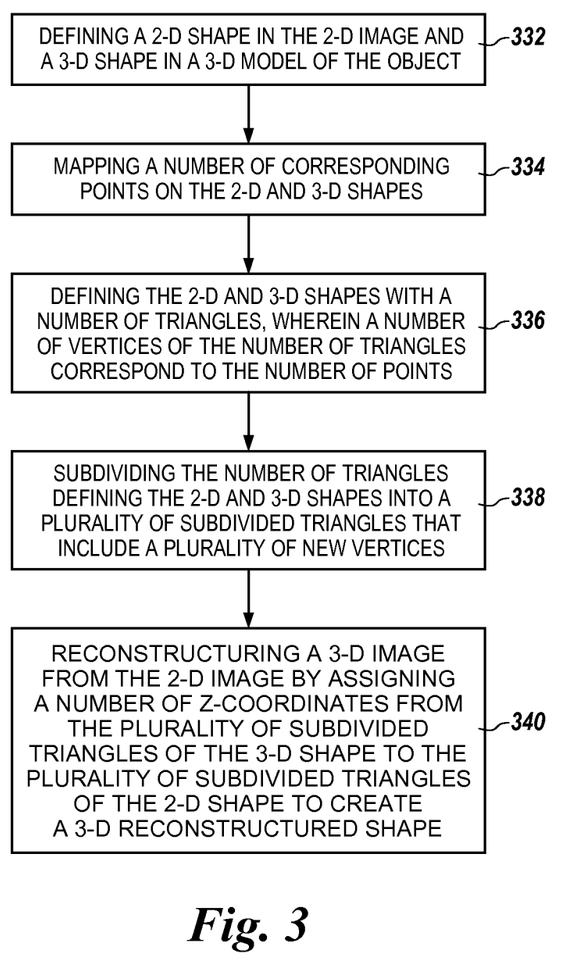
FIG. 3 provides a block diagram illustrating a method for object alignment from a 2-D image of the object according to one or more embodiments of the present disclosure.

FIG. 3 provides a block diagram illustrating a method for object alignment from a 2-D image of the object according to one or more embodiments of the present disclosure. The method includes defining a 2-D shape in the 2-D image and a 3-D shape in a 3-D model of the object, at block 332. Defining the 2-D shape in the 2-D image and the 3-D shape in the 3-D model of the object can include defining the 2-D shape in the 2-D image such that it corresponds to a position of the 3-D shape in the 3-D model. The method can include obtaining the 3-D model of the object by determining a first set of points for a first 3-D training object and a second set of points for a second 3-D training object and taking an average between the first and second set of points.

At block 334, the method includes mapping a number of corresponding points on the 2-D and 3-D shapes. The method includes, at block 336, defining the 2-D and 3-D shapes with a number of triangles, wherein a number of vertices of the number of triangles correspond to the number of points.

The method includes subdividing the number of triangles defining the 2-D and 3-D shapes into a plurality of subdivided triangles that can include a plurality of new vertices, at block 338. Subdividing each of the number of triangles defining the 2-D and 3-D shapes into a plurality of subdivided triangles can include calculating a middle point for each edge of the number of triangles and assigning each middle point as one of the plurality of new vertices for the plurality of subdivided triangles. Assigning each middle point as one of the plurality of new vertices can cause a repetition of vertices because the middle point can be along a shared edge between two triangles. In various embodiments, the method can include checking for uniqueness of the number of vertices and concatenating vertices that are unique.

In one or more embodiments, the method can include determining whether there is a redundancy in the plurality of new vertices. In an example, an edge between two triangles of the number of triangles can be shared. When the edge is shared, a length of the edge associated with a first of the two triangles can be the same length as of the edge associated with the second of the two triangles. Upon subdividing the two triangles at the midpoint of the triangle edge, the midpoint can be the same for the two triangles, which can cause a new vertex located at the midpoint to be the same for both the first and second triangle. When there is a redundancy in the plurality of new vertices, the method can include removing a redundant vertex to avoid conflicting vertices.

In some embodiments, the method can include localizing the 2-D shape of the 2-D image. As discussed herein, localizing the 2-D shape can be performed with an Active Shape Model. Upon localization of the 2-D shape, a Geometric 3-D Pose Estimator can be used to provide a number of coordinates of a rotation angle of the 2-D shape. The Geometric 3-D Pose Estimator can be defined as an algorithm that can calculate a rotation over x, y, z axes based on points associated with a 2-D shape of a 2-D image. In an example, the method can include rotating the 3-D model and 3-D shape according to the coordinates of the rotation angle of the 2-D shape. Rotating the 3-D model and 3-D shape, can be accomplished by changing the (i, j) coordinates in the X, Y, Z matrix of the 3-D model and 3-D shape. In some embodiments, therefore, the z-coordinate does not change when rotating the 3-D model and 3-D shape.

The method can include, at block 340, reconstructuring a 3-D image from the 2-D image by assigning a number of z-coordinates from the plurality of subdivided triangles of the 3-D shape to the plurality of subdivided triangles of the 2-D shape to create a 3-D reconstructured shape. Alternatively, and/or in addition, the method can include assigning the number of z-coordinates from the vertices of the number of triangles of the 3-D shape to the vertices of the number of triangles of the 2-D shape.

In some embodiments, reconstructuring the 3-D image from the 2-D image can include calculating an average intensity within one of the plurality of subdivided triangles of the 2-D shape and applying the average intensity to one of the plurality of subdivided triangles of the 3-D reconstructured shape. For instance, this can be done by determining an intensity at each of the plurality of new vertices of the 2-D shape and calculating the average intensity for the plurality of new vertices forming one of the plurality of subdivided triangles of the 2-D shape. In an example, three of the new vertices forming one of the plurality of subdivided triangles of the 2-D shape may have a different intensity. An average of the intensity existing for three of the new vertices can therefore be taken and applied the subdivided triangle formed by the new vertices.

Alternatively, and/or in addition, reconstructuring the 3-D image from the 2-D image can include adding a texture included within the 2-D shape to the 3-D reconstructured shape. In an example, the texture included within the 2-D shape can be a texture associated with a number of points on the 2-D shape, the number of vertices of the number of triangles, and/or the plurality of new vertices of the plurality of subdivided triangles.

Various embodiments of the present disclosure can include instructions for object alignment from a 2-D image of the object. The medium can define a 2-D shape in the 2-D image and a 3-D shape in a 3-D model of the object. In an example, the 2-D image of the object can be a face of an individual. The medium can map a number of points on the 2-D and 3-D shapes, wherein the points on the 2-D and 3-D shapes correspond. The medium can rotate the 3-D model and 3-D shape according to a pose of the 2-D shape, wherein the pose of the 3-D shape is calculated with a Geometric 3-D Pose Estimator.

The medium can define the 2-D and 3-D shapes with a number of triangles, wherein a number of vertices of the number of triangles correspond to the number of points and each of the number of triangles includes a face. The medium can subdivide the number of triangles defining the 2-D and 3-D shapes into a plurality of subdivided triangles that can include a plurality of new vertices, wherein each of the plurality of subdivided triangles can include a new face. The medium can assign a number of z-coordinates from the 3-D shape to the 2-D shape to create a 3-D reconstructured shape.

The medium can add a texture included within the 2-D shape to the 3-D reconstructured shape. In an example, the medium can add the texture of skin to the 3-D reconstructed shape. Alternatively, and/or in addition, the medium can add the texture according to an intensity value at the number of points on the 2-D shape.

Figure 4:
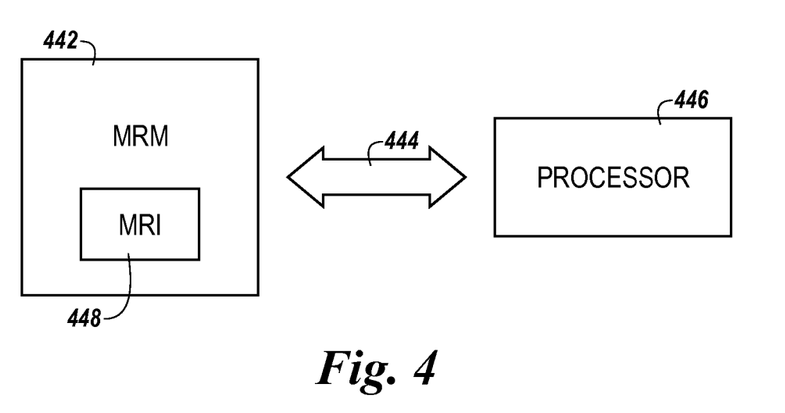
FIG. 4 illustrates a block diagram of an example of a machine readable medium in communication with processor resources according to the present disclosure.

FIG. 4 provides a block diagram illustrating an example of a machine-readable medium 442 in communication with processor resources 446 according to the present disclosure. A machine (e.g., a computing device) can include and/or receive a tangible non-transitory machine-readable medium (MRM) 442 storing a set of machine readable instructions (MRI) (e.g., software) 448 for object alignment from a 2-D image of the object, as described herein. As used herein, processor 446 resources can include one or a plurality of processors such as in a parallel processing system. The machine-readable medium 442 can include volatile and/or non-volatile memory such as random access memory (RAM), magnetic memory such as a hard disk, floppy disk, and/or tape memory, a solid state drive (SSD), flash memory, phase change memory, etc.

The MRM 442 can be in communication with the processor 446 resources via a communication path 444. The communication path 444 can be local or remote to a machine associated with the processor 446 resources. Examples of a local communication path 444 can include an electronic bus internal to a machine such as a computer where the MRM 442 is one of volatile, non-volatile, fixed, and/or removable storage medium in communication with the processor 446 resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 444 can be such that the MRM 442 is remote from the processor 446 resources such as in the example of a network connection between the MRM 442 and the processor 446 resources (e.g., the communication path 444 can be a network connection). Examples of such a network connection can include a local area network (LAN), a wide area network (WAN), a personal area network (PAN), the Internet, among other examples of networks. In such examples, the MRM 442 may be associated with a first machine (e.g., a server) and the processor 446 resources may be associated with a second machine (e.g., a computing device). The first and second machines can be in communication via a networked communication path 444.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for object alignment from a 2-dimensional (2-D) image of the object, the elements implemented by a computer, comprising:
    receiving 3-dimensional (3-D) scan data obtained from scanning of the object with a scanning device;
    obtaining a 3-D model of the object by determining a first set of points for a first 3-D training object and a second set of points for a second 3-D training object, wherein each of the second set of points correspond to a point of the first set of points;
    calculating an average between each of the corresponding points from the first and second set of points, wherein the average of the corresponding points include an x, y, z coordinate that corresponds to a distinguishing feature of the object;
    defining a 2-D shape in the 2-D image and a 3-D shape in the 3-D model of the object wherein the 3-D model is derived from the 3-D scan data;
    mapping the calculated average between each of the corresponding points on the 2-D and 3-D shapes;
    defining the 2-D and 3-D shapes with a number of triangles, wherein a number of vertices of the number of triangles correspond to the calculated average between each of the corresponding points;
    subdividing the number of triangles defining the 2-D and 3-D shapes into a plurality of subdivided triangles that include a plurality of new vertices; and
    reconstructing a 3-D image from the 2-D image by assigning a number of z-coordinates from the plurality of subdivided triangles of the 3-D shape to the plurality of subdivided triangles of the 2-D shape to create a 3-D reconstructed shape.

2. The method of claim 1, wherein the method includes calculating the pose of the 2-D shape by:
    localizing the 2-D shape of the 2-D image;
    using a Geometric 3-D Pose Estimator to provide a number of coordinates of a rotation angle of the 2-D shape; and
    rotating the 3-D model and 3-D shape according to the coordinates of the rotation angle of the 2-D shape.

3. The method of claim 1, wherein the reconstructuring the 3-D image from the 2-D image includes:
    calculating an average intensity within one of the plurality of subdivided triangles of the 2-D shape; and
    applying the average intensity to one of the plurality of subdivided triangles of the 3-D reconstructed shape.

4. The method of claim 3, wherein calculating the average intensity within one of the plurality of subdivided triangles of the 2-D shape includes:
    determining an intensity at each of the plurality of new vertices of the 2-D shape; and
    calculating the average intensity for the plurality of new vertices forming one of the plurality of subdivided triangles of the 2-D shape.

5. The method of claim 1, wherein subdividing each of the number of triangles defining the 2-D and 3-D shapes into the plurality of subdivided triangles includes:
    calculating a middle point for each edge of the number of triangles; and assigning each middle point as one of the plurality of new vertices for the plurality of subdivided triangles.

6. The method of claim 5, wherein the method includes: checking for uniqueness of the number of vertices; and concatenating vertices that are unique.

7. The method of claim 4, wherein the method includes determining whether there is a redundancy in the plurality of new vertices.

8. The method of claim 7, wherein the method includes removing a redundant vertex when a redundancy in the plurality of vertices exists.

9. The method of claim 1, wherein reconstructuring the 3-D image from the 2-D image includes adding a texture included within the 2-D shape to the 3-D reconstructured shape.

10. The method of claim 1, wherein defining the 2-D shape in the 2-D image and the 3-D shape in the 3-D model of the object includes defining the 2-D shape in the 2-D image such that it corresponds to a position of the 3-D shape in the 3-D model.

11. A machine-readable non-transitory medium storing instructions for object alignment from a 2-dimensional (2-D) image of the object executable by a machine to:
receive 3-dimensional (3-D) scan data obtained from scanning of the object with a scanning device;
obtain a 3-D model of the object by determining a first set of points for a first 3-D training object and a second set of points for a second 3-D training object, wherein each of the second set of points correspond to a point of the first set of points;
calculate an average between each of the corresponding points from the first and second set of points, wherein the average of the corresponding points include an x, y, z coordinate that corresponds to a distinguishing feature of the object;
define a 2-D shape in the 2-D image and a 3-D shape in the 3-D model of the object wherein the 3-D model is derived from the 3-D scan data;
map a number of points on the 2-D and 3-D shapes, wherein the points on the 2-D and 3-D shapes include the calculated average between each of the corresponding points;
define the 2-D and 3-D shapes with a number of triangles, wherein a number of vertices of the number of triangles correspond to the calculated average between each of the corresponding points and each of the number of triangles includes a face;
subdivide the number of triangles defining the 2-D and 3-D shapes into a plurality of subdivided triangles that include a plurality of new vertices, wherein each of the plurality of subdivided triangles includes a new face;
assign a number of z-coordinates from the 3-D shape to the 2-D shape to create a 3-D reconstructured shape; and
add a texture included within the 2-D shape to the 3-D reconstructured shape.

12. The machine-readable non-transitory medium of claim 11, wherein the 2-D image of the object is a 2-D image of a face of an individual.

13. The machine-readable non-transitory medium of claim 12, wherein the instructions executable by the machine to cause the machine to rotate the 3-D model and 3-D shape according to a pose of the 2-D shape, wherein the pose of the 3-D shape is calculated with a Geometric 3-D Pose Estimator.

14. The machine-readable non-transitory medium of claim 12, wherein the instructions executable by the machine to cause the machine to add the texture corresponding to a point on the 2-D shape to the 3-D reconstructured shape includes instructions to add the texture of skin to the 3-D reconstructured shape.

15. The machine-readable non-transitory medium of claim 11, wherein the instructions executable by the computer to add the texture corresponding to a point on the 2-D shape to the 3-D reconstructured shape include instructions to add the texture according to an intensity value at the number of points on the 2-D shape.

16. A system for object alignment from a 2-dimensional (2-D) image of the object: comprising
a machine including processor resources; and
memory resources associated with the machine, the memory resources storing machine-readable instructions that, when executed by the processor resources, cause the processor resources to:
receive 3-dimensional (3-D) scan data obtained from scanning of the object with a scanning device;
obtain a 3-D model of the object by determining a first set of points for a first 3-D training object and a second set of points for a second 3-D training object, wherein each of the second set of points correspond to a point of the first set of points;
calculate an average between each of the corresponding points from the first and second set of points, wherein the average of the corresponding points include an x, y, z coordinate that corresponds to a distinguishing feature of the object;
define a 2-D shape in the 2-D image and a 3-D shape in the 3-D model of the object, wherein the 3-D model is derived from the 3-D scan data, and wherein the object is a face of an individual;
map the calculated average between each of the corresponding points on the 2-D and 3-D shapes;
define the 2-D and 3-D shapes with a number of triangles, wherein a number of vertices of the number of triangles correspond to the calculated average between each of the corresponding points;
subdivide the number of triangles defining the 2-D and 3-D shapes into a plurality of subdivided triangles that include a plurality of new vertices;
determine whether there is a redundancy in the plurality of new vertices and remove new vertices of the plurality of vertices that are redundant;
assign a number of z-coordinates from the 3-D shape to the 2-D shape to create a 3-D reconstructured shape; and
add a texture corresponding to a point on the 2-D shape to the 3-D reconstructured shape.

17. The system of claim 16, wherein each of the number of triangles defining the 2-D and 3-D shapes are subdivided into four subdivided triangles.

18. The system of claim 17, wherein a midpoint of an edge of each side of the number of triangles forms a vertex for the four subdivided triangles.

19. The system of claim 17, wherein the texture corresponding to the plurality of new vertices for the plurality of subdivided triangles on the 2-D shape is added to the corresponding new vertices for the plurality of subdivided triangles on the 3-D reconstructured shape.

* * * * *